United States Patent
Baudelocque et al.

(10) Patent No.: US 10,393,174 B2
(45) Date of Patent: Aug. 27, 2019

(54) THRUST DISC, MAGNETIC BEARING AND APPARATUS

(71) Applicants: Luc Baudelocque, Vernon (FR); Mohamed Bendaoud, Fontaine-Heudebourg (FR); Matthieu Oliva, Vernon (FR)

(72) Inventors: Luc Baudelocque, Vernon (FR); Mohamed Bendaoud, Fontaine-Heudebourg (FR); Matthieu Oliva, Vernon (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 384 days.

(21) Appl. No.: 14/571,609

(22) Filed: Dec. 16, 2014

(65) Prior Publication Data

US 2015/0167734 A1 Jun. 18, 2015

(30) Foreign Application Priority Data

Dec. 18, 2013 (EP) .................................... 13306764

(51) Int. Cl.
*H02K 7/09* (2006.01)
*F16C 32/04* (2006.01)

(52) U.S. Cl.
CPC ...... *F16C 32/0468* (2013.01); *F16C 32/0476* (2013.01); *H02K 7/09* (2013.01); *F16C 2300/42* (2013.01)

(58) Field of Classification Search
CPC ..... Y02T 50/672; H02K 7/09; F16C 32/0468; F16C 32/0476; F16C 2300/42

(Continued)

(56) References Cited

U.S. PATENT DOCUMENTS 4,920,291 A * 4/1990 McSparran ......... F16C 32/0459
  310/90.5
5,072,146 A * 12/1991 New .................... F16C 32/0442
  310/214

(Continued)

FOREIGN PATENT DOCUMENTS

DE 102012201252 A1 * 8/2013 ........... F04D 29/023
EP 0413851 A1 * 2/1991 ........... F04D 19/048

(Continued)

OTHER PUBLICATIONS

Metalcor Alloy 718 data sheet.*

(Continued)

*Primary Examiner* — Thomas Truong
(74) *Attorney, Agent, or Firm* — Bryan Peckjian; SKF USA Inc. Patent Dept.

(57) ABSTRACT

A thrust disc for a magnetic bearing, wherein the thrust disc comprises: a body, which is adapted to be mounted on a shaft and which has a first offset yield strength and a first magnetic permeability, and at least one flange which is fixed to the body in a position where it can interact with a thrust stator in order to form a magnetic bearing and which has a second offset yield strength and a second magnetic permeability; wherein the first offset yield strength is higher than the second offset yield strength; and wherein the first magnetic permeability is smaller than the second magnetic permeability. Additionally, the magnetic bearing can be equipped with such a thrust disc. An apparatus can be equipped with such a magnetic bearing.

9 Claims, 4 Drawing Sheets

(58) Field of Classification Search
USPC .......................................................... 310/90.5
IPC ........................................................ H02K 7/09
See application file for complete search history.

(56) References Cited

U.S. PATENT DOCUMENTS

| | | | | |
|---|---|---|---|---|
| 5,406,157 | A * | 4/1995 | New ................... | F16C 32/0461 310/268 |
| 5,495,221 | A * | 2/1996 | Post ................... | F16C 32/0408 310/90.5 |
| 5,521,448 | A * | 5/1996 | Tecza ................. | F16C 32/0412 310/51 |
| 5,749,700 | A * | 5/1998 | Henry ................. | F01D 25/168 310/90.5 |
| 6,057,619 | A * | 5/2000 | Domberg ............ | F16C 32/0468 310/90 |
| 6,232,688 | B1 * | 5/2001 | Ress, Jr. ............. | C22C 47/20 310/74 |
| 2002/0129873 | A1 * | 9/2002 | Havette .............. | C22C 38/34 148/111 |

FOREIGN PATENT DOCUMENTS

| | | | | |
|---|---|---|---|---|
| EP | 1074753 | A1 | 2/2001 | |
| EP | 2006497 | A1 * | 12/2008 | .......... F16C 32/0468 |
| WO | WO 2006022554 | A1 * | 3/2006 | .............. F03B 11/06 |
| WO | 2013020880 | A1 | 2/2013 | |
| WO | WO 2013020880 | A1 * | 2/2013 | .............. F16C 17/14 |
| WO | 2013113678 | A1 | 8/2013 | |

OTHER PUBLICATIONS

HyperPhysics reference.*
Engineering archives reference.*
EP0413851 English Machine Translation.*
DE102012201252 English Machine Translation.*
WO2013020880 English Machine Translation.*
Machine Translation, Bode et al., EP 2006497 A1, Dec. 24, 2008.*

* cited by examiner

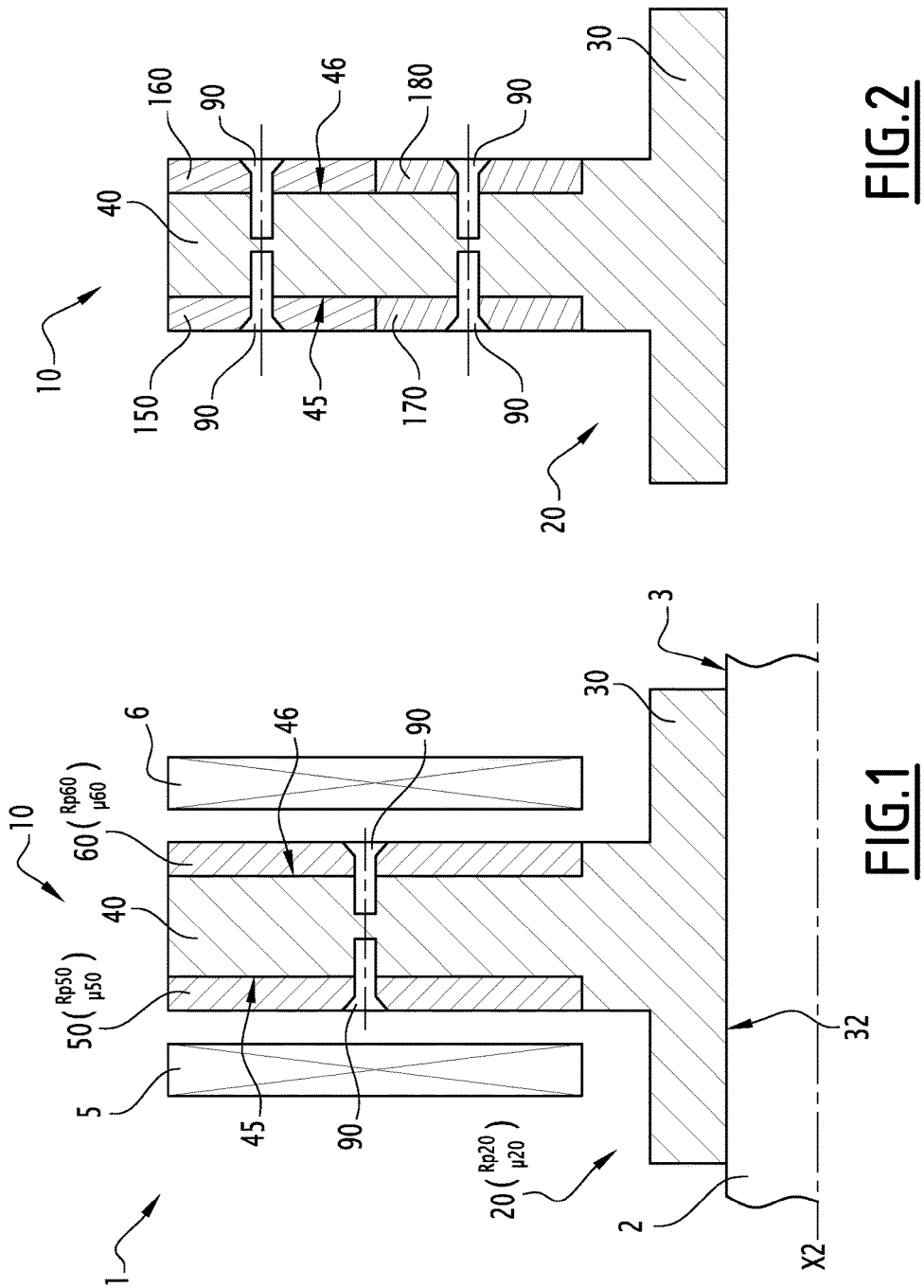

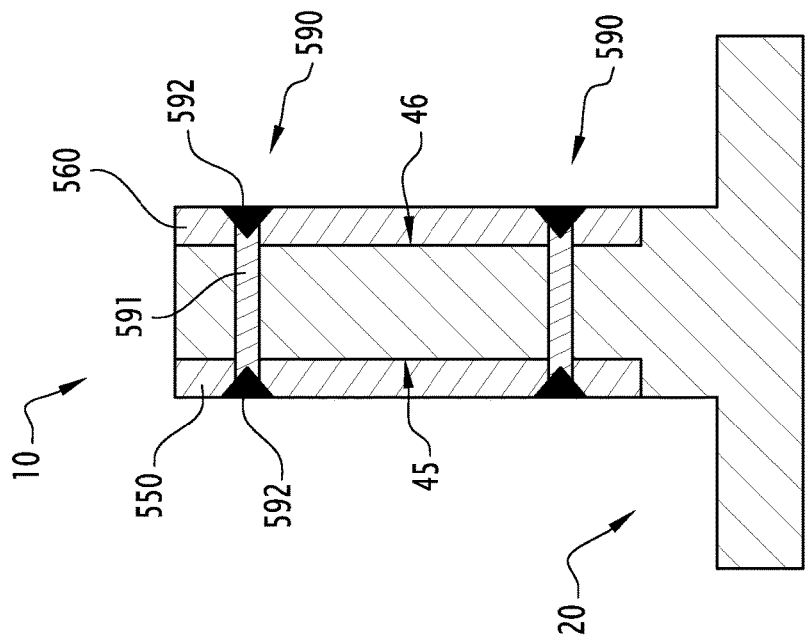
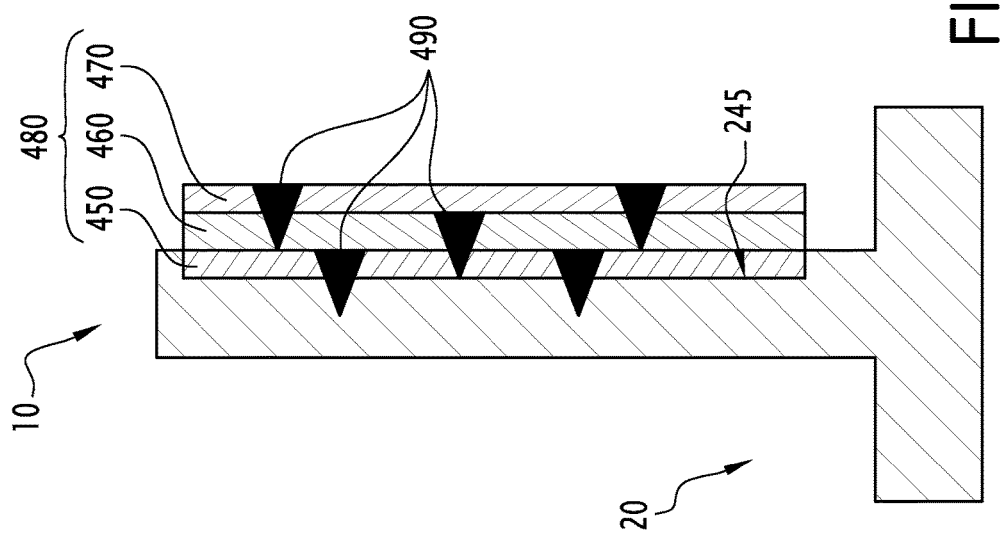

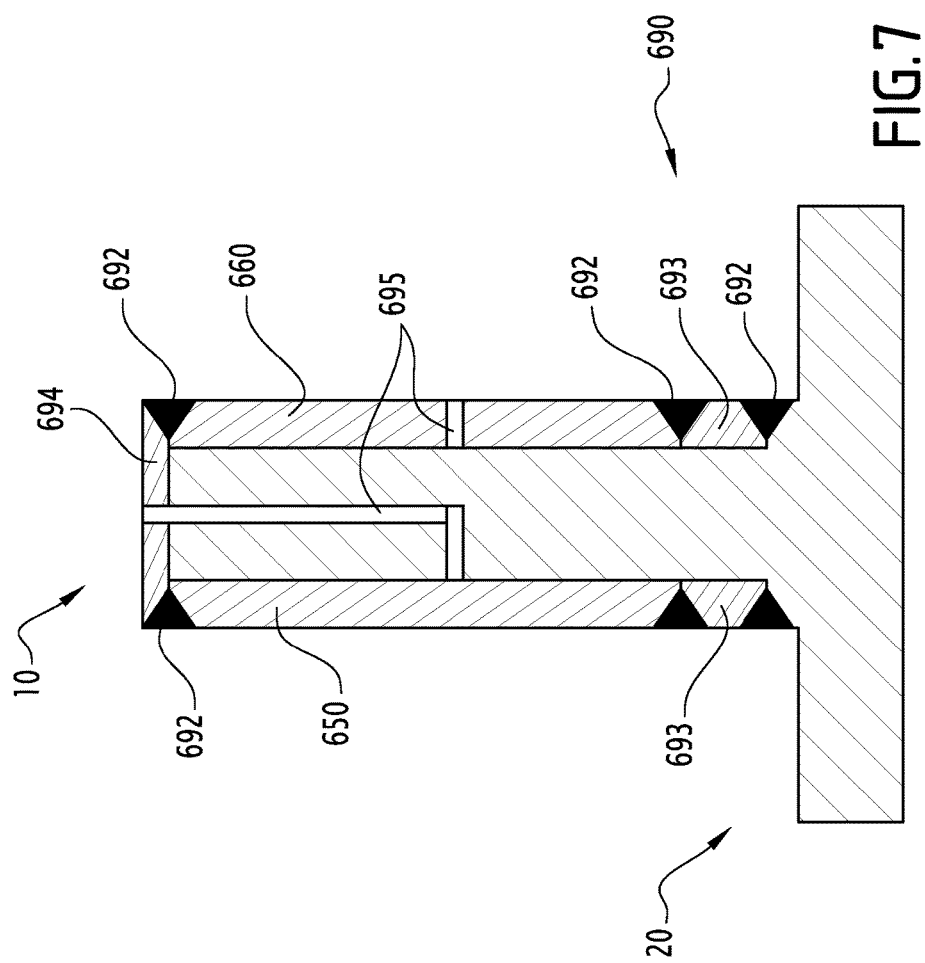

THRUST DISC, MAGNETIC BEARING AND APPARATUS

CROSS REFERENCE TO RELATED APPLICATION

This is a U.S. Non-Provisional Patent Application claiming the benefit of European Patent Application Number EP13306764 filed on 18 Dec. 2013 (18.12.2013), which is incorporated herein by reference in its entirety.

TECHNICAL FIELD OF THE INVENTION

The invention concerns a thrust disc for a magnetic bearing. The invention also concerns a magnetic bearing equipped with such a thrust disc. The invention also concerns an apparatus equipped with such a magnetic bearing.

BACKGROUND OF THE INVENTION

A thrust disc equipping a magnetic bearing usually rotates at high speed, for example between 300 and 400 meters/second, and is subjected to high stress. In corrosive environments, in particular including hydrogen sulphide ($H_2S$), such thrust disc must comply with norm NACE MR0175, have high mechanical properties and high magnetic properties at the same time.

For example, the mechanical and magnetic properties of a specific material can be quantified by its offset yield strength "Rp0.2" and its magnetic permeabily "$\mu$", respectively. In mechanics, yield strength Rp0.2 defines a relation between a plastic deformation and a stress applied to a material. In electromagnetism, permeability $\mu$ is the measure of the ability of a material to support the formation of a magnetic field within itself. In other words, permeability corresponds to the degree of magnetization that a material obtains in response to an applied magnetic field.

WO-A-2013/113678 discloses a thrust disc, comprising an annular bush, a body and a magnetic core. The bush is mounted on a shaft belonging to a turbomachine rotor. The body is fixed to the bush and enclosed the magnetic core. Depending on its material, the body may be resistant to corrosion but increases the magnetic airgap. Moreover, the complete hermetic sealing of the disk, on all its faces, is highly complicated to achieve. Furthermore, at a high pressure such as approximately 100 bars, a leak may appear in the body, so that corrosive gas may enter inside the cavity housing the magnetic core during the lifetime of the thrust disc. This leak will imply a possible corrosion of the magnetic core, internal pressure accumulation and high risk of explosive decompression.

SUMMARY OF THE INVENTION

The aim of the invention is to provide an improved thrust disc for a magnetic bearing.

To this end, the invention concerns a thrust disc for a magnetic bearing, wherein the thrust disc comprises: a body which is adapted to be mounted on a shaft and which has a first offset yield strength and a first magnetic permeability, and at least one flange which is fixed to the body in a position where it can interact with a thrust stator in order to form a magnetic bearing and which has a second offset yield strength and a second magnetic permeability; wherein the first offset yield strength is higher than the second offset yield strength; and wherein the first magnetic permeability is smaller than the second magnetic permeability.

Thanks to the invention, behavior and lifetime of the thrust disc are improved, in particular in corrosive environments. The body is resistant to centrifugal stresses, while the flange(s) allows reaching a suitable magnetic flux density within the magnetic bearing equipped with the thrust disc.

According to further aspects of the invention which are advantageous but not compulsory, such a thrust disc may incorporate one or several of the following features:

The thrust disc comprises several flanges, the first offset yield strength of the body is higher than the offset yield strength of each flange, and the first magnetic permeability of the body is smaller than the magnetic permeability of each flange.

The body and the flange or flanges are made of corrosion resistant materials.

The body has a first offset yield strength equal or superior to 800 MPa, preferably equal or superior to 1000 MPa.

The body is made of a martensitic stainless steel, preferably 17-4 PH.

The or each flange has a magnetic permeability equal or superior to 0.001 H/m, preferably equal or superior to 0.002 H/m.

The or each flange is made of a ferritic stainless steel, preferably AISI 444.

The thrust disc comprises means for fastening the flange to the body, which include at least one screw.

The thrust disc comprises means for fastening the flange to the body, which include at least one welding.

The thrust disc comprises means for fastening the flange to the body, which include at least one radial welding.

The thrust disc comprises means means for fastening the flange to the body, which include at least one rivet.

Several flanges are superposed to form a magnetic plate.

Holes are formed in the body and/or the flange for internal and external pressure equilibrium of the thrust disc.

The invention also concerns a magnetic bearing comprising a thrust disc as mentioned here-above.

The invention also concerns an apparatus comprising a magnetic bearing as mentioned here-above. In particular, the apparatus may be a turbomachine, a vacuum pump, a compressor or a chiller.

BRIEF DESCRIPTION OF THE DRAWINGS

The invention will now be explained in correspondence with the annexed figures, and as an illustrative example, without restricting the object of the invention. In the annexed figures:

FIG. 1 is a partial sectional view of a magnetic bearing according to the invention, comprising a thrust disc also according to the invention;

FIG. 2 is a view similar to FIG. 1, showing a thrust disc according to a second embodiment of the invention;

FIG. 5 is a view similar to FIG. 1, showing a thrust disc according to a fifth embodiment of the invention;

FIG. 6 is a view similar to FIG. 1, showing a thrust disc according to a sixth embodiment of the invention; and FIG. 7 is a view similar to FIG. 1, showing a thrust disc according to a seventh embodiment of the invention.

DETAILED DESCRIPTION OF SOME EMBODIMENTS

Figure 4:
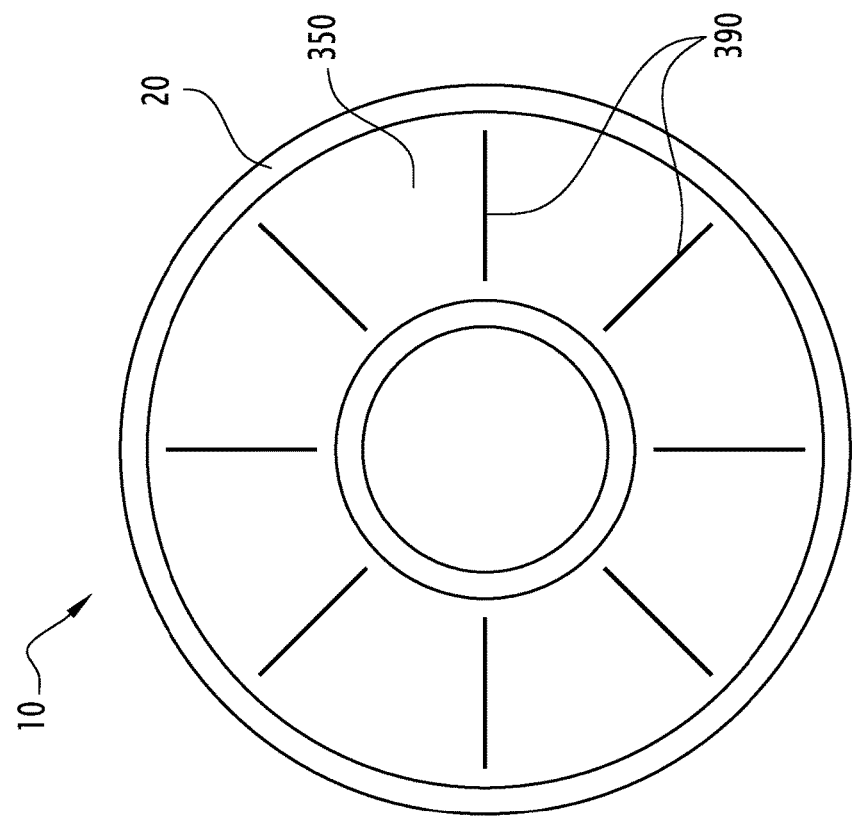
FIG. 4 is a front view along arrow IV on FIG. 3, showing a thrust disc according to a fourth embodiment of the invention.

FIG. 1 shows a magnetic bearing 1 according to the invention.

Magnetic bearing 1 is mounted on a shaft 2 belonging to an apparatus, for example a turbomachine. Shaft 2 has a cylindrical outer surface 3 centered on a central axis X2. Shaft 2 is movable in rotation around axis X2. Magnetic bearing 1 is adapted to generate an axial thrust along axis X2.

Magnetic bearing 1 comprises two thrust stators 5 and 6, schematically represented for simplification purpose. Bearing 1 also comprises an axial thrust disc 10 according to the invention, mounted on shaft 2. Thrust stators 5 and 6 are fixed to a housing not shown, while thrust disc 10 is movable in rotation around axis X2.

Thrust disc 10 comprises a body 20 and two flanges 50 and 60, each having an annular shape. When thrust disc 10 is mounted on shaft 2, then body 20 and flanges 50, 60 are centered on axis X2. Flanges 50 and 60 are destined to form a magnetic coupling with thrust stators 5 and 6, respectively. Flanges 50 and 60 are fixed to body 20 in a position where they can interact with thrust stators 5 and 6 to form the magnetic bearing 1.

Preferably, for a magnetic bearing 1 used in a corrosive environment, body 20 and flanges 50, 60 are made of corrosion resistant materials and are compliant with norm NACE MR0175, also designated as norm ISO 15156-3. Thus, thrust disc 10 is resistant to corrosive elements such as $CO_2$ and $H_2S$. In this regard, body 20 and flanges 50, 60 are preferably subjected to heat treatment, in particular post welding heat treatment when applicable.

Body 20 comprises a base portion 30 for mounting on shaft 2 and a radial portion 40 for receiving flanges 50 and 60. Body 20 is a single part, in other words portions 30 and 40 are formed integral with each other. Portion 30 extends principally along a direction parallel to axis X2, while portion 40 extends principally along a direction radial to axis X2. Portion 30 comprises a cylindrical bore 32 receiving surface 3 of shaft 2. Portion 40 includes two annular recesses 45 and 46, formed on opposite sides of body 20.

Body 20 has a first offset yield strength Rp20 at 0.2% strain and a first magnetic permeability $\mu 20$. Preferably, Rp20 is equal or superior to 800 MPa, more preferably equal or superior to 1000 MPa. In addition, $\mu 20$ is preferably equal or superior to 0.0002 H/m, more preferably equal or superior to 0.0008 H/m. For example, body 20 is made of a martensitic stainless steel, such as 17-4 PH, having an offset yield strength Rp20 generally comprised between 1100 and 1300 Mpa. According to another example, body 20 is made of a Nickel based alloy, such as Inconel (registered trademark).

Each flange 50 and 60 is preferably formed as a single part. Alternatively, each flange 50 and 60 may be made of several sectors. Flanges 50 and 60 are fastened by screws 90 in recess 45 or 46, respectively. More precisely, screws 90 press flanges 50 and 60 in recesses 45 and 46 and are threaded into portion 40 of body 20. Screws 90 are preferably made of a corrosion resistant material, such as 17-4 PH, K44 or Inconel (registered trademark). Alternatively, flanges 50 and 60 may be fastened to body 20 by glue, welding, riveting or any suitable means.

Flange 50 has a second offset yield strength Rp50 at 0.2% strain and a second magnetic permeability $\mu 50$. Flange 60 has a third offset yield strength Rp60 at 0.2% strain and a second magnetic permeability $\mu 60$. Flanges 50 and 60 are preferably made of the same material, so that Rp50 and Rp60 are equal and that $\mu 50$ and $\mu 60$ are equal. Preferably, $\mu 50$ and $\mu 60$ are superior to 0.001 H/m, more preferably superior to 0.002 H/m. In addition, Rp50 and Rp60 are preferably equal or superior to 350 MPa. For example, flanges 50 and 60 are made of a ferritic stainless steel, such as AISI 444.

In practice, when the thrust disc 10 is in operation and rotates around axis X2, centrifugal stresses applied to thrust disc 10 are concentrated close to shaft 2. Consequently, centrifugal stresses applied to body 20 and in particular to base portion 30 are higher than centrifugal stresses applied to flanges 50 and 60. Furthermore, the magnetic properties of the flanges 50 and 60 are chosen to reach a magnetic flux density preferably superior to 1.4 T (teslas) between thrust disc 10 and thrust stators 4 and 5.

According to the invention, constitutive materials of the thrust disc 10 are chosen such as mechanical properties of body 20 are higher than mechanical properties of flanges 50 and 60, while magnetic properties of body 20 are smaller than magnetic properties of flanges 50 and 60. More precisely, offset yield strength Rp20 is higher than offset yield strengths Rp50 and Rp60, while magnetic permeability $\mu 20$ is smaller than magnetic permeabilities $\mu 50$ and $\mu 60$.

Other embodiments are represented on FIGS. 2 to 7. In these embodiments, elements similar to the first embodiment have the same references and work in the same way. Only the differences with respect to the first embodiment are described hereafter. Shaft 2 and thrust stators 4 and 5 are not represented on FIGS. 2 to 7 for simplification purpose.

In the second embodiment represented on FIG. 2, the thrust disc 10 comprises two outer flanges 150 and 160 and two inner flanges 170 and 180. Flange 150 is disposed around flange 170 in recess 45, while flange 160 is disposed around flange 180 in recess 46. Each flange 150, 160, 170 and 180 is fixed by a screw 90 to body 20. Smaller flanges 150, 160, 170 and 180 are easier to manufacture than larger flanges 50 and 60. Flanges 150 and 160 can be made of the same material than flanges 170 and 180 or, alternatively, of different materials such as materials well known in the field.

Figure 3:
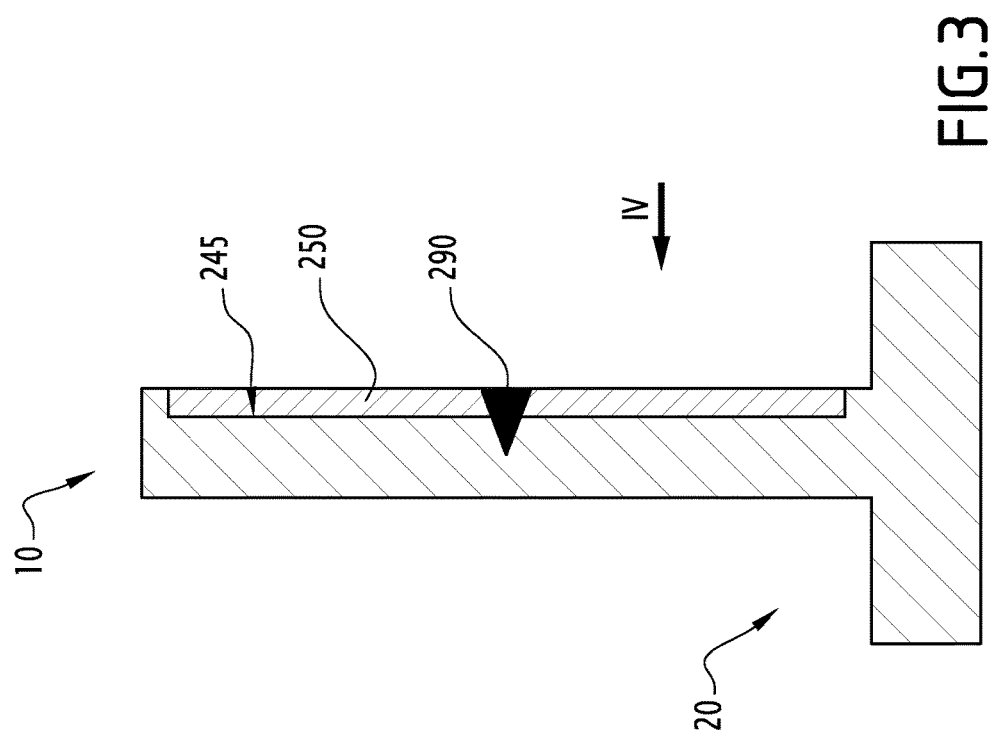
FIG. 3 is a view similar to FIG. 1, showing a thrust disc according to a third embodiment of the invention.

In the third embodiment represented on FIG. 3, the thrust disc 10 comprises one flange 250 fixed in an annular recess 245 formed in body 20. Flange 250 is fastened to body 20 by several welding points 290 distributed on the thrust disc 10. Only one welding point 290 is shown on FIG. 3 for simplification purpose. A thermal treatment may be applied to the thrust disc 10 to release the weld stresses and keep it compliant with norm NACE MR0175, for example "H 1150 M" treatment. Weldings 290 limit the creation of centrifugal stress concentrations and the deformation of flange 250 created by magnetic axial pull up force. A final machining may be performed on thrust disc 10 after the heat treatment.

In the fourth embodiment represented on FIG. 4, the thrust disc 10 comprises one flange 350 similar to flange 250. Flange 350 is fastened to body 20 by radial weldings 390 distributed around the central axis of the thrust disc 10.

In the fifth embodiment represented on FIG. 5, the thrust disc 10 comprises one magnetic plate 480 made of three superposed flanges 450, 460 and 470, which are fixed to the body 20 and to each other by performing successive welding points 490. Flanges 450, 460 and 470 are easier to manufacture with a small thickness, for example below 4 millimeters. Their superposition allows obtaining a larger magnetic plate 480 with suitable magnetic properties. To comply with norm NACE MR0175, only external flange 470 may be subjected to a heat treatment. Flanges 450, 460 and 470 can be made of the same material or, alternatively, of different materials such as materials well known in the field In the sixth embodiment represented on FIG. 6, the thrust disc 10 comprises two flanges 550 and 560 similar to flanges 50 and 60 of the first embodiment, except that flanges 550 and 560 are fixed to body 20 by fastening means 590 including rivets 591 and weldings 592. Rivets 591 extend through the flanges 550 and 560 and body 20 and are fixed to the flanges 550 and 560 by weldings 592. Rivets 591 are preferably made of a corrosion resistant material, such as K44. When flanges 550, 560 and rivets 591 are made of K44, no further heat treatment is required to comply with norm NACE MR0175.

In the seventh embodiment represented on FIG. 7, the thrust disc 10 comprises two flanges 650 and 660 fastened to body 20 by fastening means 690 including weldings 692 and inserts 693 and 694. In a first step, inserts 693 and 694 are fixed to body 20, preferably by welding. In a second step, flanges 650 and 660 are welded to inserts 693 and 694. Thus, no further heat treatment is required to comply with norm NACE MR0175. In a third step, holes 695 may be formed through body 20 and/or flanges 650, 660, for internal and external pressure equilibrium of the thrust disc 10.

Whatever the embodiment, offset yield strength Rp20 of body 20 is higher than offset yield strength Rp50, Rp60, of each flange and magnetic permeability $\mu 20$ of body 20 is smaller than magnetic permeability $\mu 50$, $\mu 60$, of each flange 50, 60, 150, 160, 170, 180, 250, 350, 450, 460, 470, 550, 560, 650 and 660.

Other non-shown embodiments can be implemented within the scope of the invention. In particular, body and flanges of the thrust disc 10 may have different configurations.

In addition, technical features of the different embodiments can be, in whole or part, combined with each other. Thus, magnetic bearing 1 and thrust disc 10 can be adapted to the specific requirements of the application.

The invention claimed is:

1. A thrust disc for a magnetic bearing, the thrust disc comprising:
   a body comprising a base portion having an axial length and a central bore configured to be mounted on a shaft and a radial ring having an axial thickness less than the axial length projecting radially outward from the base portion, the radial ring including at least one annular recess, the body having a first offset yield strength and a first magnetic permeability,
   a disc mounted in the at least one recess at a position where the disc can interact with a thrust stator in order to form a magnetic bearing, the disc having a second offset yield strength and a second magnetic permeability,
   wherein the first offset yield strength is higher than the second offset yield strength,
   wherein the first magnetic permeability is smaller than the second magnetic permeability,
   wherein the thrust disc has a radially facing outer peripheral surface, and
   wherein an axial length of the outer peripheral surface of the thrust disc is less than the axial length of the base portion.

2. The thrust disc according to claim 1, wherein the at least one recess comprises a first annular recess facing in a first axial direction and a second annular recess facing in a second axial direction opposite the first axial direction, and wherein the disc has an inner diameter greater than an outer diameter of the base portion.

3. The thrust disc according to claim 2, wherein the body is formed of a martensitic stainless steel and wherein the disc is formed of a ferritic stainless steel.

4. The thrust disc according to claim 1, wherein the axial thickness of the radial ring is substantially constant from the base portion to the outer peripheral surface.

5. The thrust disc according to claim 1, wherein an outer peripheral surface of the disc forms a portion of the outer peripheral surface of the thrust disc.

6. The thrust disc according to claim 1, including at least one fastener extending through the disc into the radial ring.

7. A thrust disc for a magnetic bearing, the thrust disc comprising:
   a body comprising a base portion having an axial length and a central bore configured to be mounted on a shaft and a radial ring having an axial thickness less than the axial length projecting radially outward from the base portion, the radial ring including at least one annular recess, the body having a first offset yield strength and a first magnetic permeability,
   a disc mounted in the at least one recess at a position where the disc can interact with a thrust stator in order to form a magnetic bearing, the disc having a second offset yield strength and a second magnetic permeability,
   wherein the first offset yield strength is higher than the second offset yield strength,
   wherein the first magnetic permeability is smaller than the second magnetic permeability,
   wherein the thrust disc has a radially facing outer peripheral surface, and
   wherein an outer peripheral surface of the disc forms a portion of the outer peripheral surface of the thrust disc.

8. The thrust disc according to claim 7,
   wherein an axial length of the outer peripheral surface of the thrust disc is less than the axial length.

9. The thrust disc according to claim 7, including at least one fastener extending through the disc into the radial ring.

* * * * *